(12) United States Patent
Hollander et al.

(10) Patent No.: US 8,269,633 B2
(45) Date of Patent: Sep. 18, 2012

(54) DATA LOGGER

(75) Inventors: Milton Bernard Hollander, Stamford, CT (US); Michael A. Macchiarelli, Shelton, CT (US)

(73) Assignee: White Box, Inc., Stamford, CT (US)

( * ) Notice: Subject to any disclaimer, the term of this patent is extended or adjusted under 35 U.S.C. 154(b) by 331 days.

(21) Appl. No.: 12/592,985

(22) Filed: Dec. 7, 2009

(65) Prior Publication Data

US 2010/0141456 A1    Jun. 10, 2010

Related U.S. Application Data

(60) Provisional application No. 61/201,166, filed on Dec. 8, 2008.

(51) Int. Cl.
*G08B 13/14* (2006.01)

(52) U.S. Cl. .............. 340/572.8; 340/572.1; 340/539.26

(58) Field of Classification Search ................ 340/572.8
See application file for complete search history.

(56) References Cited

U.S. PATENT DOCUMENTS

| | | | |
|---|---|---|---|
| 2007/0273515 A1* | 11/2007 | MacKenzie et al. | 340/572.1 |
| 2008/0084274 A1* | 4/2008 | Ohashi et al. | 340/10.1 |
| 2009/0121880 A1* | 5/2009 | Joyce et al. | 340/572.8 |

* cited by examiner

*Primary Examiner* — George Bugg
*Assistant Examiner* — Kerri McNally
(74) *Attorney, Agent, or Firm* — William A. Drucker

(57) ABSTRACT

Multiple identical data loggers are produced on sheet material and then separated to produce individual products for distribution to separate locations. A continuous roll of tape sheet material comprises a contiguous series of data loggers which each include a cover sheet, a transponder, a sensor, a power source (such as a battery), an antenna, a microprocessor, an adhesive layer and means to separate individual data logger elements from one another.

3 Claims, 3 Drawing Sheets

DATA LOGGER

This case claims the benefit of our U.S. Provisional co-pending application filed on Dec. 8, 2008, as No. 61/201,166, which is incorporated herein entirely by reference.

BACKGROUND OF THE INVENTION

The invention finds application in the field of environmental monitoring and recording and relates to semi-active and active radio frequency information device data loggers, such as RFID tags. Tags are applied to or incorporated within a product, animal or person for identification and tracking with radio waves. Tags can be detected and read from beyond line of sight by an RFID reader device. To control manufacturing costs and for ease of dispensing and use it is desirable to produce individual data loggers on a sheet material matrix such as an elongated continuous roll of tape backing. RFID tags contain an integrated circuit for detecting, processing and storing data, which is modulated and demodulated as a radio frequency signal and conveyed by an antenna. Some tags are self-powered by a battery. Passive tags have no battery power supply and require external power. Battery assisted passive tags require a power source to become active, but have no significant higher forward link capability for greater read range. It is known to make individual separate data loggers by a costly time consuming method. Individual modules are used separately for recording and storage of measurement data for subsequent harvesting and use.

It is desirable to sense, measure, transmit and record features of a product during transport and storage. Process variables, such as temperature, pressure, strain, resistance, voltage, humidity all influence consumer products. Such products include flowers, food, and pharmaceuticals. Multiple loggers are used in arrays and radio frequency connection avoids wiring installation cost and reduces maintenance cost.

SUMMARY OF THE INVENTION

Identical data logger units are produced on a sheet material matrix such as a roll of tape and are then separated from the support matrix for individual disposition and use. Individual loggers are separated by tearing on a pre-weakened seam or perforation, or are mounted to be peeled away from the matrix or from a grid, which is then disposed of or reused. Individual and separate loggers include a protective cover layer, adhesive backing a bar coded label and a write upon window area.

DETAILED DESCRIPTION OF THE INVENTION

Figure 1:
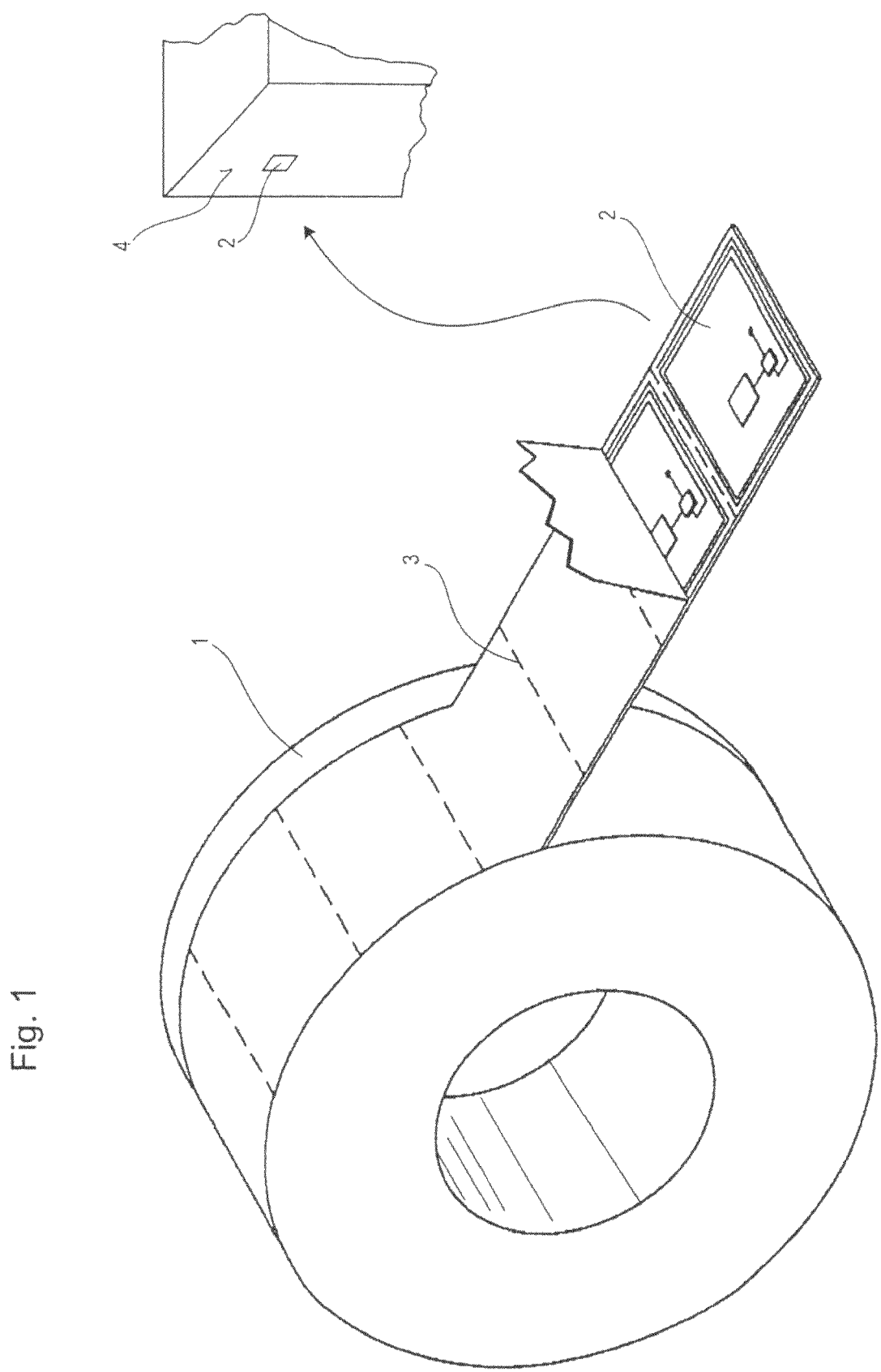
FIG. 1 is a cartoon picture of a roll of data loggers mounted with a tape support.

A first embodiment of the invention is seen in FIG. 1, which allows a user to remove individual loggers from a continuous tape matrix roll. The roll construction (1) allows separation of individual loggers (2) from the matrix and thereafter to be mounted on a measurement surface for detecting and recording environment features, such as temperature.

Figure 2:
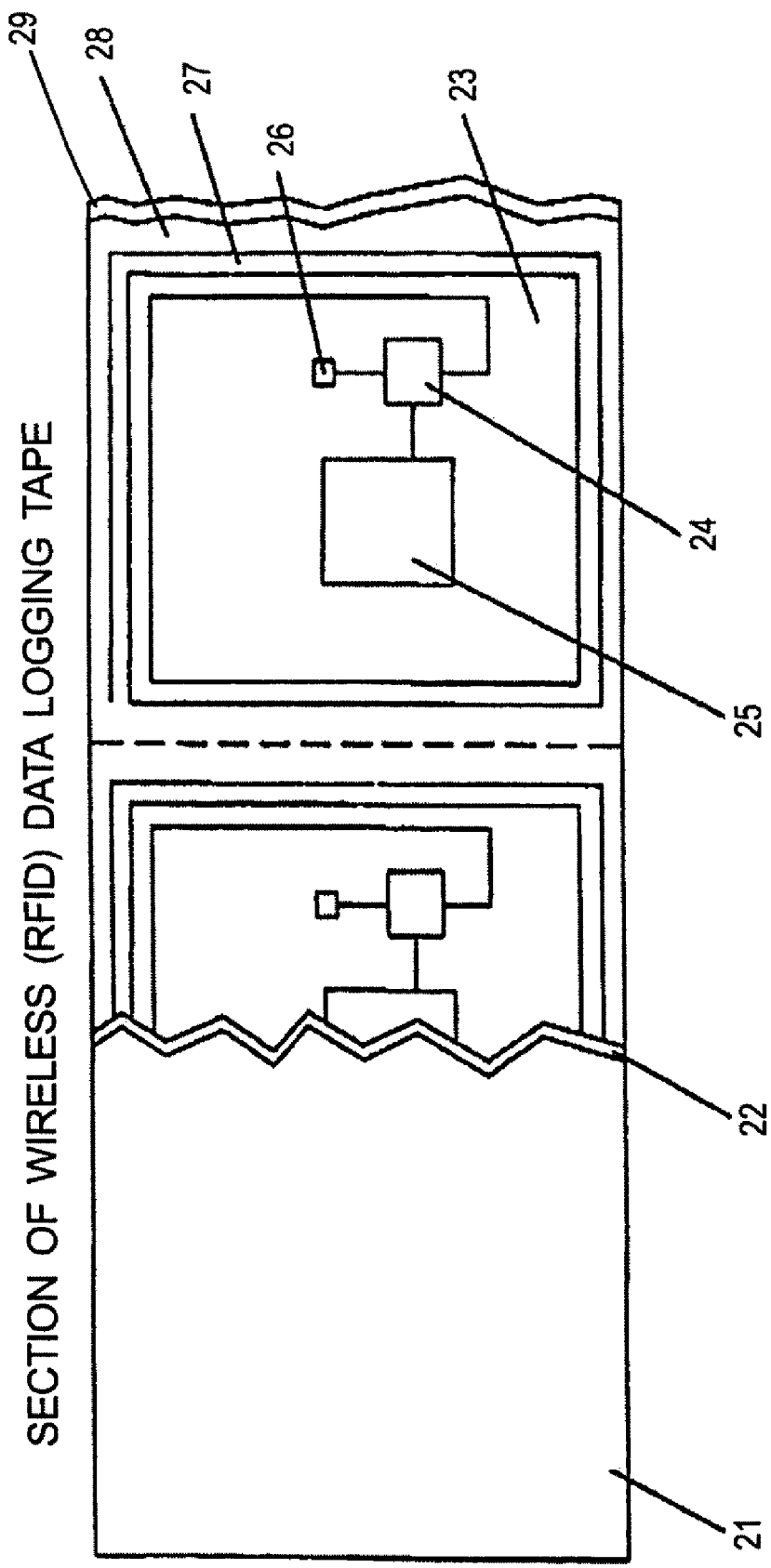
FIG. 2 is a diagram showing the elements of data loggers on the tape roll.
Figure 3:
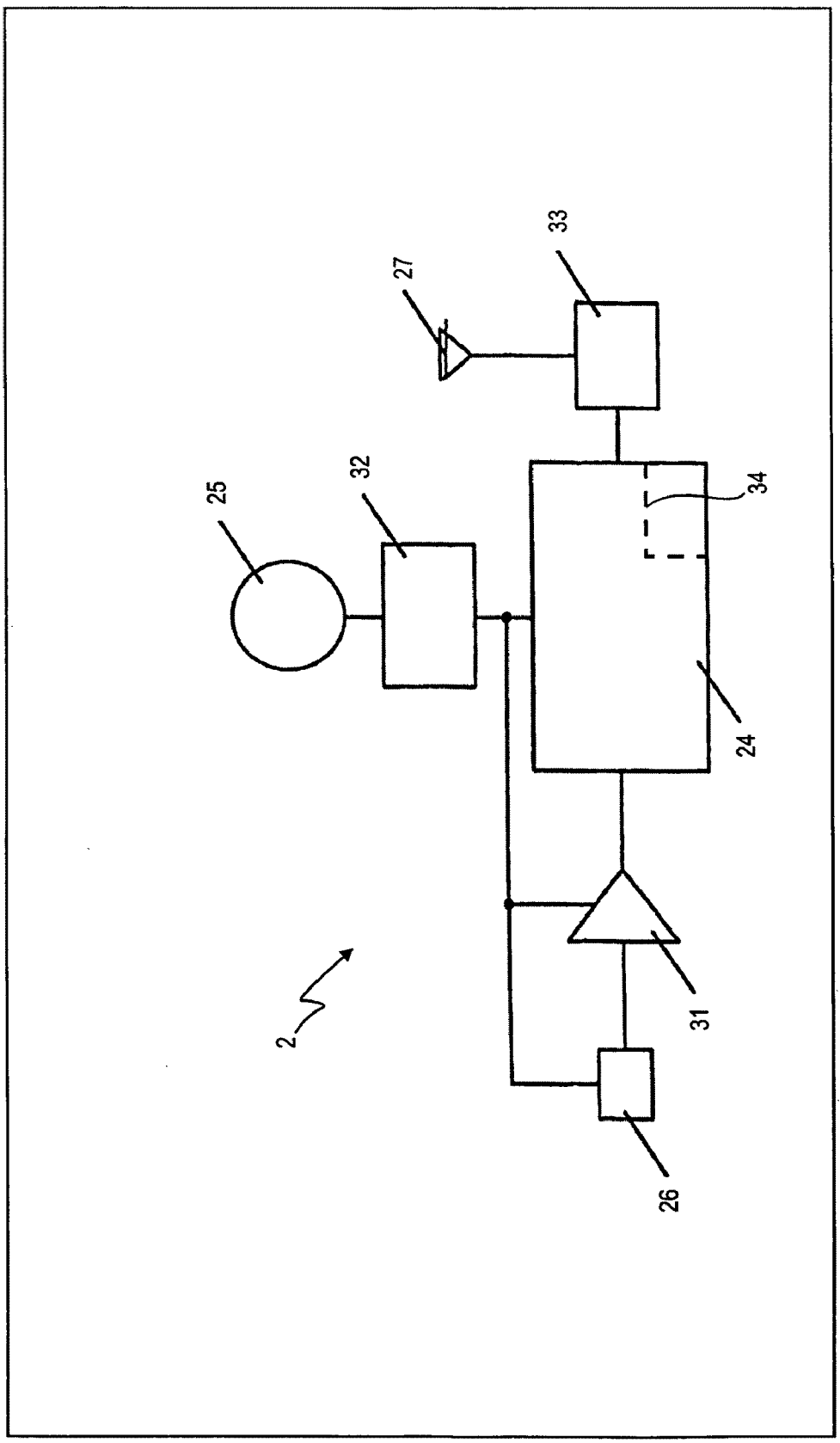
FIG. 3 is a block circuit diagram of the data logger elements connected as in operation of the product. Seven components are seen connected by lines. A power source converter is illustrated for use with an external power supply source.

Another embodiment is seen in FIG. 2, which shows detailed construction features of a roll of RFID loggers. Cover labels and an insulation protective layer are peeled back to reveal internal construction of a single removable section. Cover label (1) is placed on an insulation layer (2), which in turn is on top of a flexible printed circuit board (3). The circuit board comprises a micro processor (4), a power supply (such as a battery)(5), a sensor (6) and an antenna (7). Attached to a surface of the circuit board is an adhesive layer, such as peel away release tape (8). The composite article of manufacture comprises a high temperature backing to be removed to expose the tape segment for attachment to a measurement surface.

The invention claimed is:

1. An article of manufacture comprising a matrix roll of continuous tape sheet material supporting thereupon a plurality of contiguous separable identical RFID data logger modules, as discreet units or segments, which each comprises a cover label on an insulation layer over a flexible printed circuit board, wherein said board also comprises a microprocessor, a power supply, a sensor and an antenna and a peel away release tape having a high temperature removable backing which upon removal exposes the segment for attachment to a surface.

2. A method of manufacture of multiple data logger units which each includes a protective layer, adhesive backing, a bar coded label and a write upon window area, which method comprises forming separate identical loggers on a matrix sheet of tape material; separating said units from said sheet matrix as separate modules connected by radio frequency; and thereafter fastening said units to a measurement surface as a linked array to detect and to measure temperature of said surface.

3. A system of temperature management comprising the disposition on a thermal measurement surface of an array of discreet separate multiple identical RFID data logger units connected to one another by radio frequency links and also connected to a common power source, to detect and to measure variation of temperature of said surface; wherein each of said units comprises a temperature sensor, a power source link, an antenna and a micro processor in a flexible printed circuit board.

* * * * *